No. 764,596. PATENTED JULY 12, 1904.
G. W. KAISER.
HIGH SPEED PRESSURE REDUCING VALVE.
APPLICATION FILED JAN. 9, 1903.
NO MODEL.
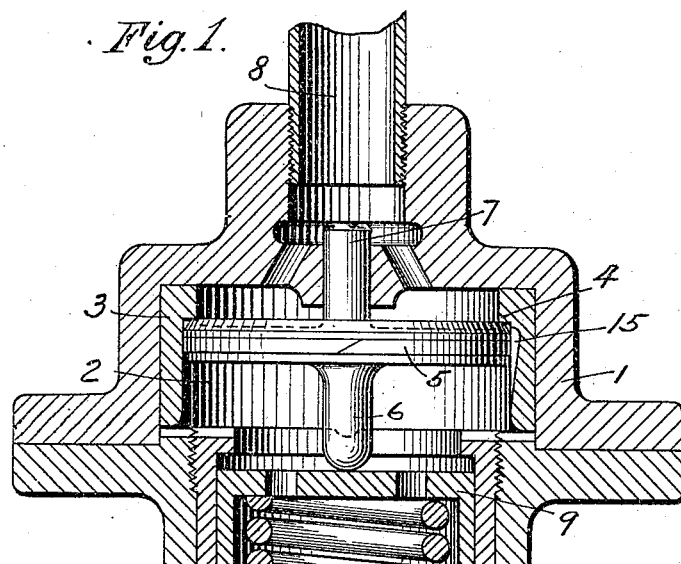
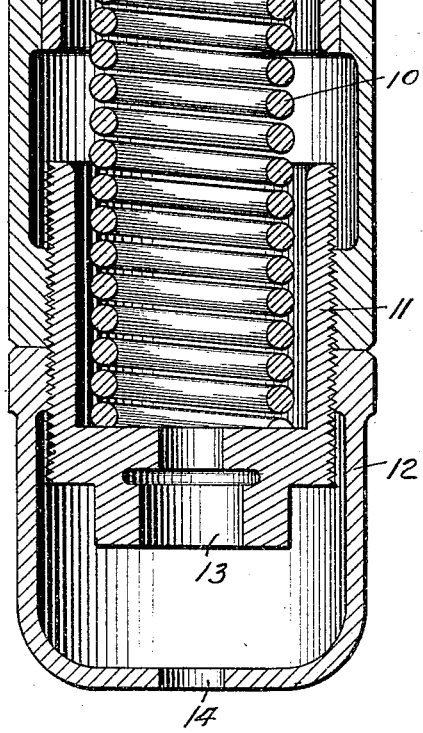
WITNESSES:
Jno. B. MacDonald
J. S. Custer
INVENTOR,
George W. Kaiser
By E. Wright
Att'y.

No. 764,596.

Patented July 12, 1904.

UNITED STATES PATENT OFFICE.

GEORGE W. KAISER, OF WILMERDING, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

HIGH-SPEED PRESSURE-REDUCING VALVE.

SPECIFICATION forming part of Letters Patent No. 764,596, dated July 12, 1904.

Application filed January 9, 1903. Serial No. 138,364. (No model.)

*To all whom it may concern:*

Be it known that I, GEORGE W. KAISER, a citizen of the United States, residing in Wilmerding, county of Allegheny, and State of Pennsylvania, have invented a certain new and useful Improvement in High-Speed Pressure-Reducing Valves, of which improvement the following is a specification.

This invention relates to fluid-pressure brakes, and more particularly to what is known as the "high-speed" brake, which is now employed upon trains adapted to run at a high rate of speed. The pressure usually carried in the high-speed brake system is much greater than is used in ordinary train service, and in order to prevent the sliding of the wheels due to excessive pressure in the brake-cylinder when running at lower speeds a pressure-reducing valve such as shown in Patent No. 506,185, of October 3, 1893, has heretofore been employed for the purpose of limiting the brake-cylinder pressure to a certain predetermined amount in service applications of the brakes and for gradually reducing the brake-cylinder pressure to a certain point after an emergency application.

One of the objects of the present invention is to provide an improvement in valves of this type whereby the construction is greatly simplified, unnecessary parts being dispensed with and the cost of manufacture reduced.

In the accompanying drawings, Figure 1 is a central sectional view of a valve device embodying my improvement; Fig. 2, a fragmentary side view of a portion of the cylinder-bushing, showing the groove therein; and Fig. 3, a horizontal section of the same.

As shown in the drawings, my improved valve device comprises a casing 1, which may be formed in two or more parts and containing a cylindrical chamber 2, having a bushing 3 provided with a shoulder or inwardly-projecting offset 4, adapted to form an annular seat for the piston 5. A tight joint at this point may be secured by a knife-edge bearing or by the use of a gasket, as may be desired. The piston 5 is provided with a suitably-guided upper stem 7 and a lower stem 6, which bears against the perforated cap 9 of the adjustable spring 10, having adjusting-nut 11 and lock-nut 12 with escape-openings 13 and 14.

In the cylinder wall or bushing 3 is located an escape port or groove 15, which is preferably made both V-shaped and tapering in depth, as shown, the widest portion thereof being formed at the upper end. The piston is normally held against the shoulder or annular seat 4 by means of the load device or spring 10, and the chamber above the piston is adapted to communicate with the brake-cylinder by means of pipe 8. The spring is adjusted to hold a certain pressure—say sixty pounds per square inch—in the brake-cylinder, and so long as the brake-cylinder pressure does not exceed this amount the piston will remain seated against the shoulder 3 and there will be no escape of air through the valve. When the brake-cylinder pressure rises above the amount for which the spring is adjusted, the piston is forced downward against the spring to a greater or less extent, according to the amount of excess pressure, thus opening the escape-groove around the piston and allowing the air under pressure from the brake-cylinder to escape to the atmosphere through said groove 15, perforated cap 9, and openings 13 and 14 in the adjusting and lock nuts. If the excess of pressure in the brake-cylinder results from a service application of the brakes, the piston 5 will move down but a short distance, leaving the escape-port 15 open at its maximum, and since this area of port-opening is calculated to release air from the brake-cylinder at substantially the same rate that it is admitted through the graduating-port of the triple valve, the brake-cylinder pressure is thus limited to a predetermined maximum in service applications. In the case of emergency applications a much greater pressure is rapidly charged into the brake-cylinder, so that a considerable excess pressure is suddenly exerted upon the piston 5, forcing the same to its lowermost position, at which the opening of the escape-port is very small, thus permitting at first a very slow escape of air from the brake-cylinder, which rate of flow gradually increases as the piston moves upward and the escape-opening becomes gradually larger until the maximum opening is reached. Then as the pressure is reduced to the predetermined maximum-service pressure as determined by the adjustment of the spring the piston is again seated against the shoulder 3, preventing further escape of air.

By locating the escape-port in the cylinder wall or bushing and controlling the same directly by the piston all additional valves and unnecessary parts are dispensed with, thus providing a very simple, compact, and efficient form of valve.

Having now described my invention, what I claim as new, and desire to secure by Letters Patent, is—

1. A pressure-reducing valve device comprising a casing containing a chamber, a piston therein exposed on one side to fluid-pressure, a spring acting on said piston, and a V-shaped escape-groove located in the wall of the piston-chamber around the piston.

2. A pressure-reducing valve device comprising a casing containing a cylindrical chamber having an annular seat, a piston in said chamber exposed to fluid-pressure, a spring for normally holding said piston against said seat, and a tapered escape-groove located in the cylinder-wall around the piston.

3. A pressure-reducing valve device comprising a casing containing a cylindrical chamber having an annular seat or shoulder, a piston in said chamber exposed to fluid-pressure, a spring for normally holding the piston seated against said shoulder, and a V-shaped escape-groove located in the cylinder-wall and controlled by the piston.

4. In a pressure-reducing valve device, the combination of a piston in a chamber open on one side to fluid under pressure, a load on the other side of said piston balancing a given or normal pressure on the opposite side and a tapered groove arranged in the wall of the piston-chamber and controlled by said piston for permitting a considerable excess of pressure to escape past the piston at a continuously-varying rate of speed as the load returns the piston toward its normal position.

5. In a pressure-reducing valve device, the combination of a piston in a chamber open on one side to fluid under pressure, a load on the other side of said piston adapted to balance a given definite pressure on the opposite side and a tapered groove arranged in the wall of the piston-chamber and controlled by the movement of said piston for permitting a considerable excess of pressure to escape past said piston, slowly at first and then at an increasing rate of speed as the load returns said piston toward its normal position.

6. In a fluid-pressure brake system, the combination, with a brake-cylinder, of a piston-chamber, a passage for permitting the pressure to escape from said cylinder through said piston-chamber, a piston in said chamber carrying a load adapted to hold it in position to close said passage when a given or normal pressure is admitted to said cylinder and a tapered groove arranged in the wall of the chamber and controlled by said piston so constructed that, when an extraordinary pressure is suddenly admitted into said cylinder, it will escape slowly at first and then at an increasing rate of speed as the piston is returned by the load toward its normal position.

7. In a fluid-pressure brake system, the combination, with a brake-cylinder, of a piston-chamber, a passage for permitting the pressure to escape from said cylinder through said piston-chamber, a piston in said chamber, a spring bearing on said piston and adjusted to hold it in position to close said passage against a given, definite pressure admitted to said cylinder, and a tapered groove so arranged in the wall of the chamber and controlled by said piston that, when a considerable excess pressure is admitted into said cylinder, the spring yields and the piston permits the pressure to escape slowly and, as the pressure falls and the spring returns the piston toward normal position, the pressure escapes at an increasing rate.

In testimony whereof I have hereunto set my hand.

GEORGE W. KAISER.

Witnesses:
R. F. EMERY,
JAS. B. MACDONALD.